United States Patent [19]

Kljuev et al.

[11] Patent Number: 4,481,825

[45] Date of Patent: Nov. 13, 1984

[54] DEVICE FOR MEASUREMENT OF VIBRATIONS

[75] Inventors: Vladimir V. Kljuev; Valery P. Kozlov; Alexandr P. Degterev; Irina A. Vainberg; Vladimir V. Demidov, all of Moscow, U.S.S.R.; Anatoly N. Filimonov, deceased, late of Moscow, U.S.S.R., by Elena V. Filimonova, administrator

[73] Assignee: Nauchno-Issledovatelsky Institut Introskopii, Moscow, U.S.S.R.

[21] Appl. No.: 468,063

[22] Filed: Feb. 22, 1983

[51] Int. Cl.³ .............................................. G01H 9/00
[52] U.S. Cl. ....................................... 73/655; 73/658; 343/17.7
[58] Field of Search ................. 73/658, 655; 343/17.7, 343/6 R

[56] References Cited

U.S. PATENT DOCUMENTS 2,550,700  5/1951  Lancor et al. ...................... 343/6 R
3,199,103  8/1965  Augustine ......................... 73/658 X

OTHER PUBLICATIONS

"Measurement of Vibrations and Linear Displacements . . . " by Namitokov et al. from Measuring Instruments, No. 5, 1960, Journal of the State Committee for Standards . . . Council of Ministers, USSR.
"Journal of the Acoustic Society of America" vol. 30, No. 7 Jul. 1958, pp. 644–645, "Proposed Massless Remote Vibration Pickup" by Stewart.

Primary Examiner—James J. Gill
Attorney, Agent, or Firm—McAulay, Fields, Fisher, Goldstein & Nissen

[57] ABSTRACT

A device for measurement of vibrations comprises a microwave generator whose energy is transmitted through an antenna system to an object being investigated, reflected therefrom and fed to a detector through an antenna system, said detector also receiving energy of high-frequency reference oscillations. The antenna system comprises an elliptical mirror, in the first focal point of which, near the mirror, there is mounted a radiator irradiating the entire surface of said mirror, while the object being investigated is located in the immediate vicinity of the second focal point, which is remote from the mirror.

3 Claims, 3 Drawing Figures

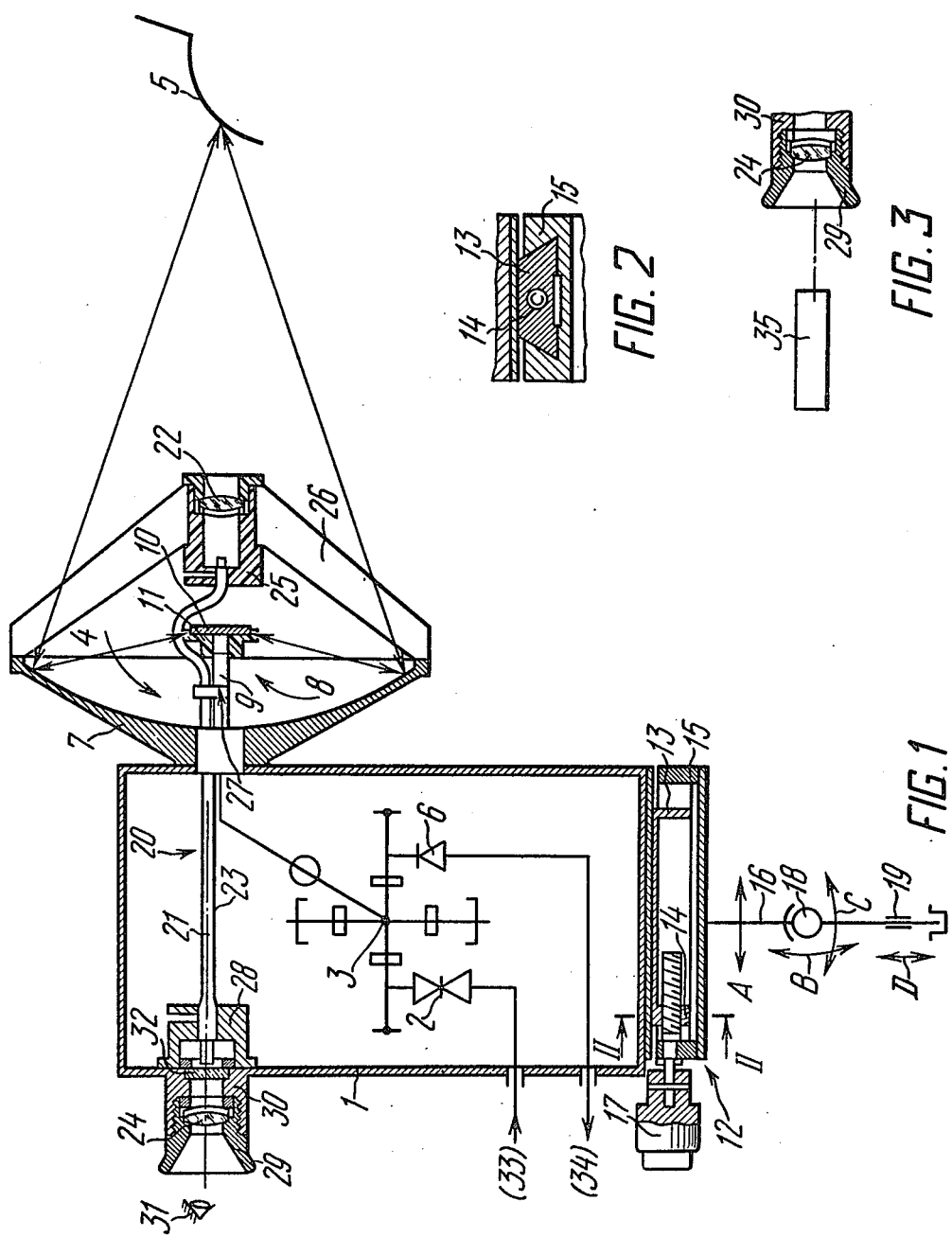

DEVICE FOR MEASUREMENT OF VIBRATIONS

TECHNICAL FIELD

The present invention relates to measuring instruments and, more particularly, the invention relates to devices for measurement of vibrations.

The invention can be used for controlling the parameters of vibration of machines and mechanisms or their components, heated surfaces, building structures and parts of a human body at a distance of a few meters from the object being investigated also under conditions of poor illumination.

BACKGROUND OF THE INVENTION

Known in the art is a device for measuring vibrations including a microwave generator transmitting its energy through an antenna system to an object being investigated and the reflected microwave energy is sent through an antenna system to a detector, which also receives high-frequency reference oscillations (cf. K. K. Namitkov, V. F. Chepura "Measurement of Vibrations and Linear Displacements by means of Microwaves" in journal "Measuring Instruments" No. 5,1960).

In this device the antenna system is made in the form of a waveguide with a rectangular cross section. The flange of the waveguide is located close to the object to be investigated, as a rule, at a distance commensurable with the wavelength of the microwave generator. As this distance increases, the spatial resolution and sensitivity of such a device make worse.

Also known in the art is a device for measuring vibrations, includes a microwave generator whose energy is transmitted to the object being measured through an antenna system. The microwave energy is reflected from this object and through an antenna system comes to a detector, which is also supplied by reference high-frequency oscillations (cf. Stewart Ch., Proposed Massless Remote Vibration, Pickup, J. Acoust. Soc. Amer. v. 30, No. 7, 1958, pp. 644–645).

In this device the antenna system is made in the form of two separate horn antennas 50 mm in diameter and includes receiving and transmitting antennas.

This device is designed for operation at a distance of 250 mm from the vibrating surface. In this case the diameter of the monitored section on the object being investigated is equal to approximately 104 mm.

In this device the space resolution and sensitivity get worse as soon as the vibration pickup is removed from the vibrating surface for a distance of a few meters due to an increase in the diameter of the illuminated section of the object and reduction of the portion of the reflected energy taken by the receiving antenna. Thus, when the distance of the object to be studied is increased to 3 m, the diameter of the monitored section is equal to at least 700 mm, while the fraction of the reflected energy fed to the vibration pickup is reduced to at least a few orders of magnitude compared to the energy sent through a distance of 250 mm.

Furthermore, the adjustment of said antenna system of this device and its guidance to a definite section of a shaped object at considerable distances presents practical difficulties. Since the microwave radiation is invisible, the operator cannot evaluate the accuracy of adjustment of the antenna system.

BRIEF DESCRIPTION OF THE INVENTION

An object of the present invention is to increase the operating range of the device for measurement of vibrations to a few meters while preserving its resolution and sensitivity.

Another object of the invention is to increase the accuracy of the guidance of the device to the specified section of the object being monitored.

This object is achieved by providing a device for measurement of vibrations comprising a microwave generator transmitting microwave energy through an antenna system to an object to be investigated. A portion of this energy is reflected from the object and through a receiving antenna comes to a detector, which is also supplied by reference high-frequency oscillations; according to the invention, the antenna system includes an elliptical mirror having a second focal point in the immediate vicinity of the object being investigated, while the radiator is located in the first focal point close to the mirror, said radiator irradiating the whole surface of said mirror.

The mirror of the antenna system can be installed so that it is capable of moving in the axial direction with respect to the object being investigated.

It is expedient that the device for measurement of vibrations includes an optical guidance system for aiming the mirror of the antenna system at the object being investigated mounted so that its optical axis coincides with the mirror axis.

It is also advisable that the optical guidance system for aiming the mirror of the antenna system includes an objective located in front of the radiator as viewed from the object being investigated, a light guide for transmission of an image of the object; one of the end faces of the light guide is preferably located in the focal plane of said lens on the side of the radiator of the antenna system and an ocular mounted behind the other end face of the light guide.

It is expedient that the optical guidance system used for aiming the mirror of the antenna system at the object being investigated is additionally provided with a light source located in front of the ocular on side opposite to the light guide for transmission of the image of the object being investigated.

Such a design of the device for measurement of vibrations ensures good resolution and sensitivity when a large-size object to be measured is located at a considerable distance from the device.

A small (within the wavelength of the microwave generator) displacement of the mirror of the antennas system relative to the object to be investigated makes it possible to adjust the device for maximum sensitivity when measuring the distance to the vibrating surface.

Furthermore, the construction of the antenna system greatly facilitates the adjustment and tuning of the device for measurement of vibrations. The optical guidance system of said device, the axis of which coincides with that of the mirror of the antenna system, provides high accuracy of aiming the device at any section of the object under study.

When the optical system is provided with a light source, it is possible to illuminate the monitored section of the object being investigated and this is necessary, for example, for measuring the vibration of an object under conditions of poor external illumination which does not allow the operator to see the image of the object under investigation through the ocular of the optical guidance system.

BRIEF DESCRIPTION OF THE DRAWINGS

These and other objects of the invention will be apparent from the detailed description of the invention by way of example with reference to the appended drawings, in which:

FIG. 1 is a schematic diagram of the device for measurement of vibrations, according to the invention;

FIG. 2 is a sectional view along the line II—II in FIG. 1;

FIG. 3 is another embodiment of the device for measurement of vibrations, according to the invention (a light source and an ocular).

DETAILED DESCRIPTION OF THE INVENTION

The device for measurements of vibrations, according to the invention, comprises a housing 1 (FIG. 1) accommodating a microwave generator 2 and a waveguide system 3 consisting of a tourniquet connection, i.e. a cross-like system of waveguides of a rectangular cross section, to the center of which a circular waveguide is connected, the axis of said waveguide being perpendicular to the cross plane.

A larger portion of the energy of the microwave generator 2 is transmitted to an object 5 to be investigated (shown in the drawing) through the waveguide system 3 and an antenna system 4. The energy reflected from the object 5 is transmitted through the antenna system 4 and the waveguide system 3 to the detector 6 located in the housing 1 and also supplied with reference high-frequency oscillations from the same microwave generator 2 through the waveguide 3. Thus, the microwave generator is also used as a local oscillator.

The antenna system 4 comprises an elliptical mirror 7 having a first focal point close to the mirror 7, where there is mounted a radiator 8 irradiating the entire surface of the mirror 7, and a second focal point removed from the mirror 7 and located in the immediate vicinity of the object 5 being investigated.

The mirror 7 is rigidly secured on the external surface of the wall of the housing 1. The radiator 8 is made in the form of a circular waveguide 9, serving as a continuation of the circular waveguide of the waveguide system 3 and extending through an opening in the central part of the mirror 7 and an opening in the wall of the housing 1, and a flat metal reflector mounted at a definite distance from the end face of the waveguide 9, said distance depending on the wavelength of the microwave generator 2. The reflector 10 is secured on a dielectric bushing 11, which, in turn, is secured on the waveguide 9. The radiator 8 is rigidly connected to the mirror 7.

The mirror 7 of the antenna system 4 is capable of moving in the axial direction with respect to the object 5 under study (in the direction shown by the arrow A in the drawing) with the help of a mechanism 12. The latter includes a carriage 13 secured at the external side of the housing 1 and coupled through a screw pair 14 with a guide 15 secured on a stand 16 (shown conventionally in the drawing since it is not an object of our invention). A knob 17 is provided for moving the carriage 13 along the guide 15. The guide 15 is shaped as a dovetail, as clearly seen in FIG. 2.

The stand 16 (FIG. 1) has a hinge point 18 for scanning the housing 1 together with the mirror 7 of the antenna system 4 in vertical and horizontal planes in the direction of the arrows B and C and an element 19 for moving the housing 1 together with the mirror 7 in the direction of the arrows D (in the vertical direction with respect to the object 5 being investigated).

The device according to the invention includes an optical guidance system 20 for aiming the mirror 7 of the antenna 4 at the object 5 being investigated. The system 20 is mounted to that its optical axis 21 coincides with the axis of the mirror 7.

The optical system 20 comprises an objective 22 located on the axis 21 of the mirror 7 in front of the reflector 10 of the radiator 8 as viewed from the investigated object 5, a light guide 23 for transmission of the image of the object 5, one of the end faces of which is located in the focal plane of the objective 22 at the side of the reflector 10 of the radiator 8 and an ocular 24 mounted behind the other end face of the light guide 23.

The objective 22 is secured on a dielectric bushing 25 secured on dielectric ribs 26, which, in turn, are secured on the mirror 7. To reduce the shading of the mirror 7 with the elements of the optical system 20, the objective 22 is disposed immediately behind the reflector 10 of the radiator 8 and dimensions lower than those of the reflector 10.

The light guide 23 is passed through said opening in the wall of the housing 1 and in the central portion of the mirror 7, is connected with the waveguide 9 through a clamp 27 and envelops the bushing 11 entering a bushing 25 with its one end. The other end of the light guide 23 is clamped in a bushing 28 secured on the internal surface of the wall of the housing 1.

The ocular 24 is secured in a tube 29 capable of rotating in a bushing 30 secured to the external surface of the wall of the housing 1 on the side opposite to the place of mounting of the bushing 28. Thus, the ocular 24 is mounted so that it can be moved for focusing to the eye of an observer 31.

Secured in the immediate vicinity of the end face of the light guide 23 at the side of the ocular 24 in a bushing 30 is a glass plate 32 having a cross sight for accurate aiming at the specified part of the object 5 being investigated and closing the opening in the wall of the housing 1 between the bushings 28 and 30.

According to the invention, the microwave generator 2 is connected to a power supply source 33, while the output of the detector 6 is connected to means 34 for processing the signal. The source 33 and means 34 are conventionally shown in the drawing, because they are not an object of the invention.

Under conditions of poor illumination the optical system 20 for aiming the mirror 7 of the antenna system at the object 5 to be investigated is additionally provided with a light source 35 (FIG. 3) disposed in front of the ocular 24 on the side opposite to the light guide 23 (FIG. 1). A laser may be used as a light source 35.

The device for measurement of vibrations according to the invention operates as follows.

The microwave energy of the generator 2 (FIG. 1) is transmitted through the waveguide system 3 to the radiator 8 irradiating the entire surface of the mirror 7 of the antenna system 4. The waveguide system 3 is adjusted so that a fraction of the energy of the generator 2 is fed directly into the arm of the detector 6, i.e. the microwave generator 2 is at the same time a local oscillator.

The elliptical mirror 7 of the antenna system 4 focuses the microwave energy into a narrow beam near its second focal point, where the object 5 under study is located. The microwave energy reflected from the object 5 being investigated and phase-modulated thereby is received by the same antenna system 4 and is fed through the waveguide system 3 to the detector 6, where it is mixed with the unmodulated oscillations of the local oscillator. As a result, the detector 6 produces at its output a frequency-modulated signal whose amplitude and frequency carry information on the parameters of the vibration of the object 5 being investigated. This signal is sent to the input of the means 34, in which it is amplified and processed in a well known manner.

Since the sensitivity of the proposed device for measurement of vibrations depends on the phase relations between the energy reflected from the object 5 under study and the energy of the master oscillator, in order to obtain the maximum modulation percentage in modulating the output signal of the detector 6, there is provided axial displacement of the mirror 7 within the wavelength of the microwave generator 2 by rotating the knob 17 actuating the carriage 13 which moves along the guide 15.

According to the invention, the device for measurement of vibrations is aimed at the specified section of the monitored object 5 effected by means of an optical guidance system 20 and a stand 16 making it possible to change the height of the device with respect to the monitored object 5 and to scan the device in the vertical and horizontal planes.

Looking at the object 5 with the eye 31 through the ocular 24 of the optical guidance system 20 and using the hinge joint 19 and the element 20 of the stand 16, the operator coincides the image of the cross sight of the plate 32 with the image of the selected section of the object 5 being investigated.

Under conditions of poor external illumination, which does not allow the operator to visually aim the device for measuring vibrations according to the invention, there is provided illumination of the center of the selected section of the object 5 through the same optical system 20 using a light source 35 (FIG. 3).

The device for measurement of vibrations, according to the invention, operating at an ultra high frequency wavelength of 8.5 mm with an elliptical mirror 7 (FIG. 1) about 300 mm in diameter at an operating range of 3–5 m has a diameter of the irradiated section (space resolution) from 80 to 150 mm, in which case the amount of energy fed to the detector 6 changes but only a few times. The accuracy of aiming the axis of the mirror 7 of the antenna system 4 at the selected section of the object 5 by means of the optical guidance system 20 is within 0.5 to 1 mm.

In the description of the preferred embodiment of the invention a concrete terminology is used for clearness. However, the invention is not restricted to the accepted terms and it will be noted that each such term covers all equivalent elements operating in the same way and used for solving the same technical problems.

Although the present invention is described with reference to its preferably embodiment, it is clear to those skilled in the art that other embodiments can be realized without departing from the idea and scope of the invention.

These embodiments and variations are within the essence of scope of the invention as defined by the following claims.

It is claimed is:

1. A device for measurement of vibrations, comprising:
    a microwave generator generating energy;
    an antenna system mounted behind said microwave generator in the direction of progagation of said energy, said antenna system directing the energy to an object to be investigated and comprises the following units:
    a radiator installed behind said microwave generator in the direction of propagation of its energy and receiving this energy;
    an elliptical mirror having a first focal point near said mirror and a second focal point remote from said mirror, said radiator being disposed at said first focal point and irradiating the entire surface of said mirror, the object to be investigated being located in the immediate vicinity of the second focal point, said object receiving the energy radiated by said mirror and reflecting this energy;
    a detector disposed so that it receives all the energy reflected from said investigated object through said mirror and said radiator and the energy of reference high-frequency oscillations, and said energies when mixed producing a frequency-modulated signal carrying information on the parameters of the vibration of said object being investigated;
    an optical guidance system for aiming said mirror of said antenna system at said object being investigated, said optical guidance system being installed so that its optical axis coincides with the axis of said mirror; and
    said optical guidance system for aiming said mirror of said antenna system at said object comprises:
    an objective disposed in front of said radiator as viewed from said object being investigated;
    a light guide for transmission of an image of said object having a first end face and a second end face, the first end face of said light guide being disposed in the focal plane of said objective as viewed from said radiator of said antenna system; and
    an ocular disposed behind the second end face of said light guide.

2. A device according to claim 1, in which
    said mirror of said antenna system is mounted so that it is capable of axial movement with respect to said object being investigated.

3. A device according to claim 1, in which
    said optical guidance system for aiming said mirror of said antenna system at said object being investigated comprises a light source disposed in front of said ocular as viewed from the side opposite to said light guide for transmission of the image of said object being investigated.

* * * * *